(12) United States Patent
Ezaki

(10) Patent No.: US 11,376,982 B2
(45) Date of Patent: Jul. 5, 2022

(54) CURRENT CONTROL METHOD AND CURRENT CONTROL DEVICE FOR ON-BOARD CHARGER

(71) Applicant: Nissan Motor Co., Ltd., Yokohama (JP)

(72) Inventor: Masato Ezaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/980,451

(22) PCT Filed: Mar. 15, 2018

(86) PCT No.: PCT/IB2018/000381
§ 371 (c)(1),
(2) Date: Sep. 14, 2020

(87) PCT Pub. No.: WO2019/175614
PCT Pub. Date: Sep. 19, 2019

(65) Prior Publication Data
US 2021/0016674 A1    Jan. 21, 2021

(51) Int. Cl.
*H02J 7/00*     (2006.01)
*B60L 53/62*    (2019.01)
*B60L 50/64*    (2019.01)

(52) U.S. Cl.
CPC .............. *B60L 53/62* (2019.02); *B60L 50/64* (2019.02); *H02J 7/00714* (2020.01); *B60L 2240/549* (2013.01); *H02J 2310/48* (2020.01)

(58) Field of Classification Search
USPC ................................................. 320/104, 109
See application file for complete search history.

(56) References Cited

U.S. PATENT DOCUMENTS

| | | | | |
|---|---|---|---|---|
| 5,191,277 | A * | 3/1993 | Ishikura | H02J 7/0036 320/114 |
| 6,275,007 | B1 * | 8/2001 | Tokuyama | H02J 7/0068 320/130 |
| 7,459,886 | B1 * | 12/2008 | Potanin | H02J 7/0068 320/135 |
| 2013/0320922 | A1 * | 12/2013 | Acena | B60L 53/66 320/109 |
| 2017/0320396 | A1 * | 11/2017 | Kim | B60L 53/20 |

(Continued)

FOREIGN PATENT DOCUMENTS

| | | | | |
|---|---|---|---|---|
| CA | 2866827 | A1 * | 10/2013 | ............ B60W 10/06 |
| CN | 103475072 | A | 12/2013 | |
| CN | 105103404 | A | 11/2015 | |

(Continued)

*Primary Examiner* — Samuel Berhanu
(74) *Attorney, Agent, or Firm* — Global IP Counselors, LLP

(57) ABSTRACT

A current control method and a current control device is configured to control an on-board charger that supplies current to high-power components and a battery. When the on-board charger is controlled, the current control is executed to supply output current to the high-power components and the battery such that the output current is a sum of a drive current to be supplied to high-power components capable of computing current consumption based on their own operating states and the charging current to the battery.

11 Claims, 2 Drawing Sheets

(56) References Cited

U.S. PATENT DOCUMENTS

2018/0056804 A1   3/2018   Koike et al.

FOREIGN PATENT DOCUMENTS

| CN | 107800166 A | 3/2018 |
| JP | 2012-85519 A | 4/2012 |
| WO | 2014/162907 A1 | 10/2014 |
| WO | 2017/222074 A1 | 12/2017 |

* cited by examiner

CURRENT CONTROL METHOD AND CURRENT CONTROL DEVICE FOR ON-BOARD CHARGER

CROSS-REFERENCE TO RELATED APPLICATIONS

This application is a U.S. national stage application of International Application No. PCT/IB2018/000381, filed on Mar. 15, 2018.

BACKGROUND

Technical Field

The present invention relates to a current control method and a current control device for an on-board charger.

Background Information

Japanese Laid-Open Patent Application No. 2012-85519 (Patent Document 1) discloses a method for controlling an on-board charger that supplies DC charging current to a battery mounted in an electric vehicle, comprising setting a maximum DC charging current in accordance with a control signal indicating the electric current/power that the on-board charger can use, and supplying to a battery DC charging current up to the maximum DC charging current.

SUMMARY

In addition to a battery, high-power components are connected to the path that connects the on-board charger to the battery. If a high-power component is operating during charging of the battery, some of the current supplied from the on-board charger is consumed by the high-power component, and the battery charging time becomes long.

On the other hand, in order to shorten the charging time of the battery, if the on-board charger outputs the sum of "current necessary to charge the battery" and "current consumed by the high-power component," there is the risk of supplying excess current to the battery as the operating state of the high-power component changes. This is because if the operating state of the high-power component changes and the current consumed by the high-power component decreases, the current corresponding to the decrease will flow into the battery.

In view of the problem described above, an object of the present invention is to provide a current control method and a current control device for an on-board charger that prevents the supply of excess current to the battery and that reduces the charging time of the battery.

In order to solve the problem described above, in the current control method and the current control device for an on-board charger according to one aspect of the present invention, when an on-board charger that supplies current to high-power components and a battery is controlled, current control is executed to supply output current, which is the sum of drive currents that is to be supplied to high-power components configured to compute current consumption based on their own operating states and charging current of the battery, to the high-power components and the battery.

According to the present invention, it is possible to prevent the supply of excess current to the battery, even if the current consumption of the high-power component suddenly drops, and also to shorten the charging time of the battery.

BRIEF DESCRIPTION OF THE DRAWINGS

Referring now to the attached drawings which form a part of this original disclosure.

DETAILED DESCRIPTION OF EMBODIMENTS

Figure 1:
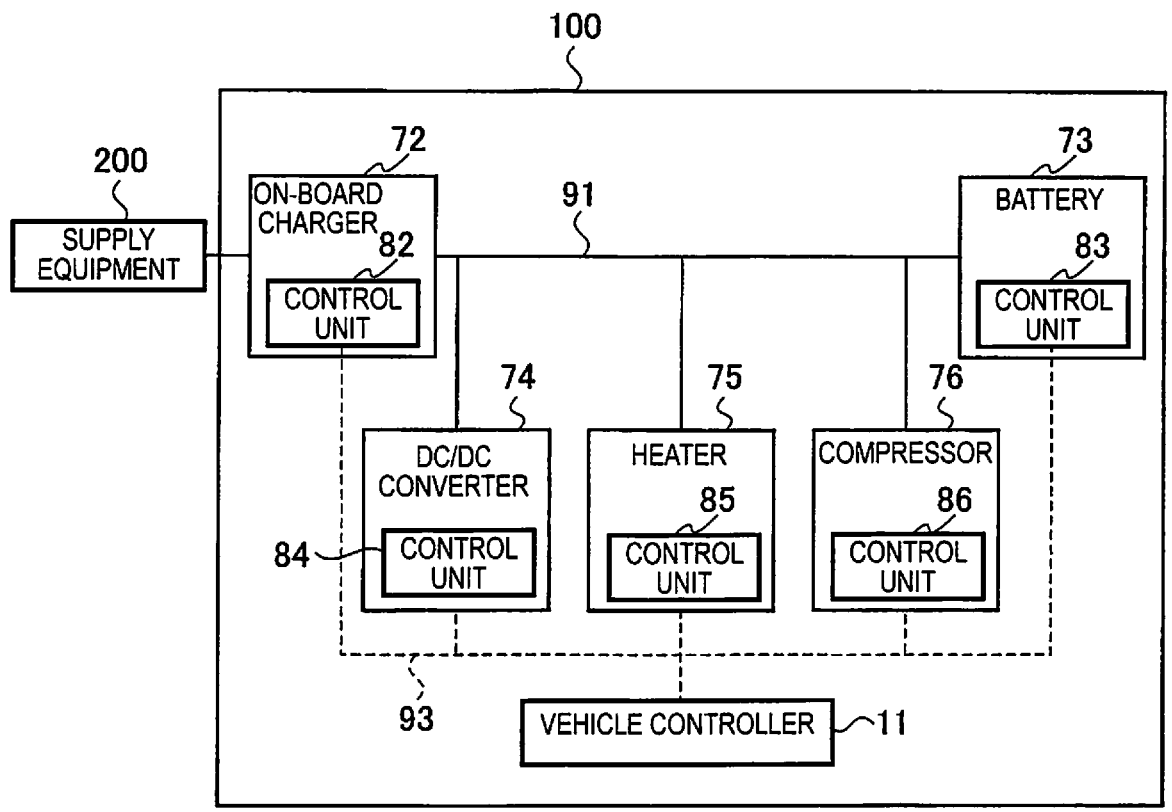
FIG. 1 is a block diagram illustrating a configuration of a current supply system including a current control device according to one embodiment of the present invention.

An embodiment of the present invention will be described next with reference to the drawings. In the explanations, the same elements have been assigned the same reference numerals, and redundant explanations are omitted.

Configuration of Current Supply System

A current supply system including a current control device according to the present embodiment will be described with reference to FIG. 1. As shown in FIG. 1, current supply system 100 includes a vehicle controller 11 (current control device), an on-board charger 72, a battery 73, a DC/DC converter 74, a heater 75, and a compressor 76. The current supply system 100 is mounted in a vehicle, which is not shown.

The on-board charger 72, the battery 73, the DC/DC converter 74, the heater 75, and the compressor 76 are electrically connected via high-voltage system wiring 91 (high-voltage electrical system). Devices other than the battery 73 that are connected to the high-voltage system wiring 91 and that are sourced current from the on-board charger 72 via the high-voltage system wiring 91 are called high-power components. In the present embodiment, the DC/DC converter 74, the heater 75, and the compressor 76 correspond to high-power components. High-power components are not limited to the DC/DC converter 74, the heater 75, and the compressor 76.

The on-board charger 72, the battery 73, and the high-power components (DC/DC converter 74, heater 75, compressor 76) each include a control unit (control circuit). As shown in FIG. 1, the on-board charger 72, the battery 73, the DC/DC converter 74, the heater 75, and the compressor 76 are provided with an on-board charger control unit 82, a battery control unit 83, a DC/DC converter control unit 84, a heater control unit 85, and a compressor control unit 86, respectively.

The vehicle controller 11 is connected via a signal line 93 so as to be capable of communicating with the control units 82-86. The signal line 93 may be in wired or wireless form.

The on-board charger 72 is controlled by the on-board charger control unit 82. When charging the battery 73 mounted in the vehicle, the on-board charger 72 is supplied current from supply equipment 200 provided externally to the vehicle, and sources the current to the high-voltage system wiring 91 based on a command from the vehicle controller 11. The current supplied from the on-board charger 72 is supplied to the battery 73 and the high-power parts via the common high-voltage system wiring 91. The on-board charger 72 may be supplied with current from a generator, which is not shown.

The battery 73 has a charging/discharging function, which is controlled by the battery control unit 83. When the battery 73 is being charged, the energy carried by the current, which is input from the on-board charger 72 to the battery 73 via the high-voltage system wiring 91, is stored in the battery 73. Conversely, when the battery 73 discharges, the energy stored in the battery 73 is supplied to the high-power components via the high-voltage system wiring 91.

The high-power components operate by consuming the current supplied from the battery 73 or the on-board charger 72 via the high-voltage system wiring 91. In particular, when the battery 73 is being charged, the high-power components operate by consuming some of the current supplied from the on-board charger 72 via the high-voltage system wiring 91. The current that is not consumed by the high-power components is supplied to the battery 73.

The DC/DC converter 74 is controlled by the DC/DC converter control unit 84, consumes the current input via the high-voltage system wiring 91, and supplies the current necessary for auxiliary devices, not shown, connected to the DC/DC converter 74. Specifically, the DC/DC converter 74 transforms the current input via the high-voltage system wiring 91 and outputs the transformed current to the auxiliary devices. Examples of auxiliary devices include a storage battery, a car stereo, and a navigation system.

The heater 75 is controlled by the heater control unit 85, consumes the current input via the high-voltage system wiring 91 and converts electrical energy to thermal energy, thereby warming the vehicle or each part of the vehicle interior. For example, the heater 75 warms the air inside the vehicle cabin, the seat and steering wheel surfaces, etc.

The compressor 76 is controlled by the compressor control unit 86, consumes the current input via the high-voltage system wiring 91, and drives an air conditioner, not shown.

Here, the high-power components are classified into first high-power components configured to compute current consumption based on their own operating states, and second high-power components not configured to compute current consumption based on their own operating states. "Can calculate current consumption based on their own operating states" means that the relationships of correspondence between the operating states of the high-power components and the current consumed by the high-power components are known in advance, and that the current consumed by the high-power components in a specific operating state can be calculated based on the aforementioned relationships of correspondence.

The operating state of the heater 75 is characterized by physical quantities such as the amount of thermal energy generated per unit time and the set-point temperature of the heater 75. Since there is a relationship of correspondence between current consumption and the amount of thermal energy generated per unit time, it can be said that the heater 75 "can calculate the current consumption based on its own operating state." In the present embodiment, the heater 75 is classified as a first high-power component.

Similarly, the operating state of the compressor 76 is characterized by physical quantities such as the amount of work per unit time, the rotational frequency of a motor inside the compressor 76, the amount of discharge of the compressor 76, the volume of gas to be compressed, and the set-point temperature of the air conditioner driven by the compressor 76, etc. Since there is a relationship of correspondence between these state quantities and current consumption, it can be said that the compressor 76 "can calculate the current consumption based on its own operating state." In the present embodiment, the compressor 76 is classified as a first high-power component.

Unlike the heater 75 and the compressor 76, it is unclear whether the DC/DC converter 74 is classified as a first high-power component or a second high-power component. This is because various types of devices can be assumed to be auxiliary devices connected to the DC/DC converter 74, and the current consumption of the DC/DC converter 74 depends on the operating states of the auxiliary devices connected to the DC/DC converter 74.

The vehicle controller 11 can be realized by a general-purpose microcomputer equipped with, for example, a CPU (central processing unit), memory, and an input/output unit. A computer program (control program) that causes the microcomputer to function as the vehicle controller 11 is installed in the microcomputer and executed. The general-purpose microcomputer thereby functions as the vehicle controller 11.

In the present embodiment, an example is shown in which the vehicle controller 11 is realized by means of software, but the vehicle controller 11 may of course be configured by preparing dedicated hardware for executing all information processing described below. In addition, a plurality of units (41, 43, 45, 47, 49) included in the vehicle controller 11 may be configured by individual hardware. Moreover, the vehicle controller 11 may also serve as an electronic control unit (ECU) used for other controls relating to the vehicle.

In addition, the vehicle controller 11 may also serve as the control units 82-86. That is, the high-power components may be directly controlled by the vehicle controller 11. In this case, the vehicle controller 11 itself has functional constituent elements corresponding to the control units 82-86 that control the high-power components.

Configuration of Vehicle Controller

Figure 2:
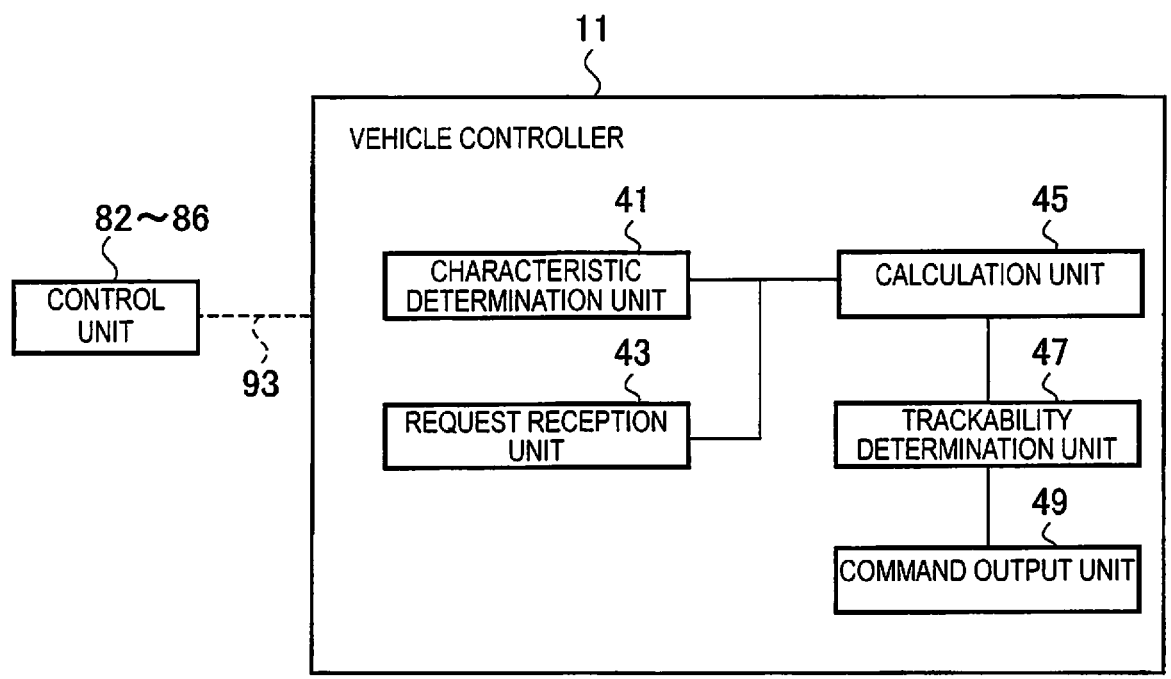
FIG. 2 is a block diagram illustrating functional constituent elements included in the current control device according to the embodiment of the present invention.

The functional constituent elements included in the vehicle controller 11 will now be described with reference to FIG. 2. The vehicle controller 11 has, as functional constituent elements, a characteristic determination unit 41 (characteristic determination circuit), a request receiving unit 43 (request receiving circuit), a calculation unit 45 (calculation circuit), a trackability determination unit 47 (trackability determination circuit), and a command output unit 49 (command output circuit).

The characteristic determination unit 41 acquires characteristic data of the high-power components from the control units of the high-power components (DC/DC converter control unit 84, heater control unit 85, compressor control unit 86) to determine the characteristics of the high-power components. That is, the characteristic determination unit 41 handles each of the high-power components connected to the on-board charger 72 via the high-voltage system wiring 91 as a target for determining the given characteristic.

Then, the characteristic determination unit 41 determines whether the target high-power component is classified as a first high-power component (high-power component configured to compute current consumption based on its own operating state) or as a second high-power component (high-power component not configured to compute current consumption based on its own operating state). The determination is carried out based on the characteristic data acquired by the characteristic determination unit 41 from the control unit of each high-power component. The characteristic determination unit 41 stores the determination result of each high-power component in a memory, not shown, or the like.

For example, during the first communication with the vehicle controller 11, the control unit of each high-power component notifies the characteristic determination unit 41 whether a relationship of correspondence between the operating state of the high-power component and the current consumed by the high-power component is stored in the control unit, as the characteristic data. The characteristic determination unit 41 determines that the high-power component is a first high-power component if the correspondence relationship is stored in the control unit, and that the high-power component is a second high-power component if the correspondence relationship is not stored in the control unit.

The control unit of each high-power component may also notify the characteristic determination unit 41 of an identification number of the high-power component controlled by the control unit as the characteristic data. The characteristic determination unit 41 may use the reported identification number as a retrieval key, in order to determine from a database, not shown, whether the high-power component corresponding to the notified identification number is classified as a first high-power component or a second high-power component.

If it can be assured that all of the high-power components connected to the high-voltage system wiring 91 are first high-power components, it is not necessary for the vehicle controller 11 to determine whether a given high-power component is a first high-power component or a second high-power component. If this is the case, the vehicle controller 11 carries out all subsequent processes under the assumption that all of the high-power components are first high-power components.

In addition to the foregoing, the characteristic determination unit 41 acquires from the on-board charger control unit 82 the quantity of current (supply current) that is actually being supplied by the on-board charger 72 via the high-voltage system wiring 91, as information relating to the operating state of the on-board charger 72.

In addition, the characteristic determination unit 41 acquires from the on-board charger control unit 82 upper and lower limits of a supply current change rate (change in supply current per unit step) that can be realized by the on-board charger 72, as information relating to the characteristics of the on-board charger 72. The upper and lower limits of the supply current change rate are determined by the performance of the on-board charger 72. The characteristic determination unit 41 stores the information relating to the characteristics of the on-board charger 72 in a memory, not shown, or the like.

The "unit step" that appears in the definition of the supply current change rate corresponds to the time interval during which the processing of the vehicle controller 11 is carried out. However, the change in supply current per unit time may be defined as the supply current change rate.

In addition, the characteristic determination unit 41 may also acquire from the battery control unit 83 the quantity of current that is actually being supplied to the battery 73. Further, the characteristic determination unit 41 may also acquire from the control unit of a high-power component the quantity of current that is actually being supplied to the high-power component.

The request receiving unit 43 receives a "change request" for the operating state from the control unit of the first high-power component. When the control unit of a first high-power component attempts to change the operating state of the first high-power component that it controls, this control unit of the first high-power component transmits a "change request" to the request receiving unit 43 before actually changing the operating state. As a result, it is possible to detect that the operating state of the first high-power component (the first high-power component corresponding to the "change request") controlled by the control unit that issued the "change request" may be changed in the near future when the "change request" is received.

In the present embodiment, the request receiving unit 43 receives the "change request" for the operating state of the heater 75 from the heater control unit 85 and receives the "change request" for the operating state of the compressor 76 from the compressor control unit 86.

If the DC/DC converter 74 is classified as a first high-power component, the request receiving unit 43 receives "change requests" for the operating states of the high-power components of the DC/DC converter 74 from the DCDC converter control unit 84.

In addition, the request receiving unit 43 receives a charging current value (charging current value IB) required to charge the battery 73 from the battery control unit 83.

The calculation unit 45 computes, as an operating current value ID, a value of the drive current expected to be supplied to the first high-power components overall, when it is assumed that changes to the operating states of the first high-power components corresponding to a "change request" have actually been made. Specifically, based on the relationship of correspondence between the current consumption and the operating state related to a first high-power component, the calculation unit 45 predicts the current consumption corresponding to the operating states after the operating state of each of the first high-power components is changed. Then, the sum of the current consumption expected for each of the first high-power components is computed as the operating current value ID.

In addition, the calculation unit 45 computes the value of the drive current to be supplied to the first high-power components overall before the operating states are changed as a pre-change operating current value IDB. Specifically, based on the relationship of correspondence between the current consumption and the operating state related to a first high-power component, the calculation unit 45 computes the current consumption corresponding to the operating state before the operating state of each first high-power component is changed. Then, the sum of the current consumptions computed for each first high-power component is calculated as the pre-change operating current value IDB.

The method of computing the drive current to be supplied may differ depending upon whether the current that flows into a first high-power component is feedback-controlled or feed-forward-controlled.

More specifically, if the current that flows into a first high-power component is feed-forward-controlled, the current consumption corresponding to the current operating state of the first high-power component may be calculated as the drive current to be supplied to the first high-power component.

On the other hand, if the current that flows into a first high-power component is feedback-controlled, the current that is actually supplied to the first high-power component may be calculated as the drive current to be supplied to the first high-power component.

When it is assumed that the operating state of a first high-power component corresponding to a "change request" is actually changed, the trackability determination unit 47 determines whether the drive current to be supplied to the high-power component decreases before and after the operating state is changed. In addition, when the drive current to be supplied to the high-power component decreases, the trackability determination unit 47 determines whether the on-board charger 72 can track the decrease in the drive current to be supplied. The specific determination process used by the trackability determination unit 47 will be described further below.

The command output unit 49 transmits a current command value IV to the on-board charger 72, which is the sum of the operating current value ID and the charging current value IB. In addition, a "permission to change" the operating state is transmitted to the control unit of a first high-power component corresponding to a "change request." The specific transmission processing used by the command output unit 49 will be described further below.

The control unit of the first high-power component that receives the "permission to change" actually changes the operating state of the first high-power component.

Processing Procedure of Current Control Process

The processing procedure of the current control carried out by the current control device according to the present embodiment will now be described with reference to the flowchart of FIG. 3. The charging control process shown in FIG. 3 is started at the same time that the charging of the battery 73 mounted in the vehicle is started and is executed repeatedly.

Figure 3:
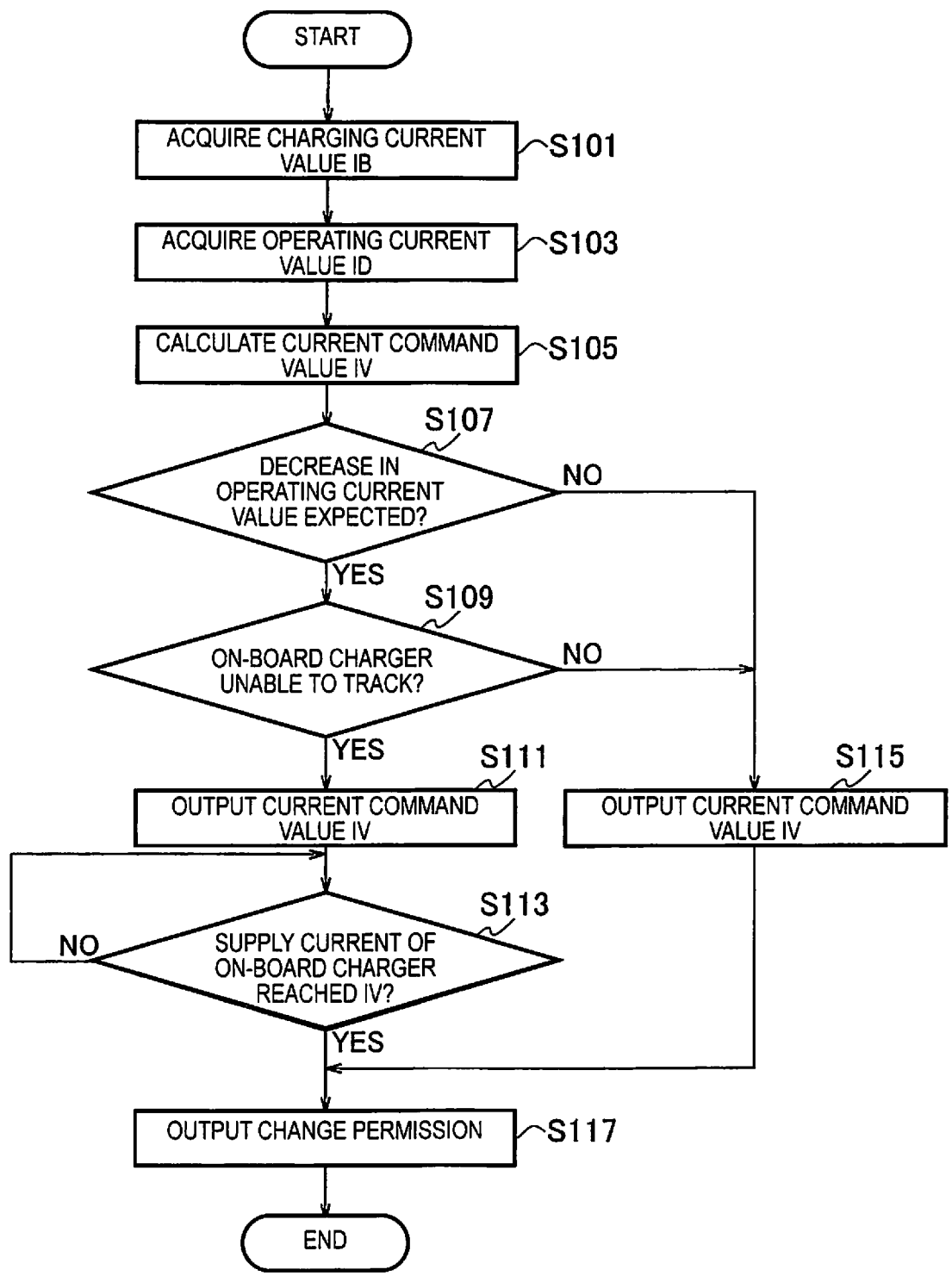
FIG. 3 is a flowchart illustrating a processing procedure of current control carried out by the current control device according to the embodiment of the present invention.

Before the current control process shown in the flowchart of FIG. 3 is executed, the characteristic determination unit 41 determines whether a given high-power component is classified as a first high-power component or a second high-power component, as necessary. If it is known in advance that all of the high-power components are first high-power components, it is not necessary for the characteristic determination unit 41 to classify the high-power components, and the subsequent processes are carried out under the assumption that all of the high-power components are first high-power components.

As shown in FIG. 3, first, in Step S101, the request receiving unit 43 receives the charging current value IB, which is the charging current value required to charge the battery 73, from the battery control unit 83.

Then, in Step S103, the calculation unit 45 acquires or computes the operating current value ID and the pre-change operating current value IDB.

In Step S105, the calculation unit 45 computes the current command value IV, which is the sum of the operating current value ID and the charging current value IB.

Then, in Step S107, when it is assumed that the operating state of a first high-power component corresponding to a "change request" is actually changed, the trackability determination unit 47 determines whether the drive current to be supplied to the high-power component is expected to decrease before and after the operating state is changed. Specifically, the pre-change operating current value IDB and the operating current value ID obtained in Step S103 are compared, and if the operating current value ID is less than the pre-change operating current value IDB (operating current value ID<pre-change operating current value IDB), it is determined that the drive current to be supplied to the high-power component decreases.

If it is determined that the drive current to be supplied to the high-power component is not expected to decrease (NO in Step S107), in Step S115, the command output unit 49 transmits the current command value IV to the on-board charger 72, and, further, in Step S117, the command output unit 49 transmits a "permission to change" the operating state to the first high-power component.

If it is determined that the drive current to be supplied to the high-power component is expected to decrease (YES in Step S107), the process proceeds to Step S109.

In Step S109, the trackability determination unit 47 determines whether the on-board charger 72 cannot track the decrease in the drive current to be supplied. Specifically, the absolute value of the lower limit of the supply current change rate (change in the supply current per unit step) that can be realized with the on-board charger 72 is set as a threshold value $\Delta TH$, and if the difference between the operating current value ID and the pre-change operating current value IDB is greater than the threshold value $\Delta TH$ (|operating current value ID—pre-change operating current value IDB|>threshold value $\Delta TH$), it is determined that the on-board charger 72 cannot track the decrease in the drive current to be supplied.

If it is determined that the on-board charger 72 can track the decrease in the drive current to be supplied (NO in Step S109), in Step S115, the command output unit 49 transmits the current command value IV to the on-board charger 72, and, further, in Step S117, the command output unit 49 transmits a "permission to change" the operating state to the first high-power component.

If it is determined that the on-board charger 72 cannot track the decrease in the drive current to be supplied (YES in Step S109), the process proceeds to Step S111.

In Step S111, the command output unit 49 transmits the current command value IV to the on-board charger 72, and, then, in Step S113, the trackability determination unit 47 determines whether the supply current of the on-board charger 72 has reached the current command value IV.

If it is determined that the supply current of the on-board charger 72 has not reached the current command value IV (NO in Step S113), the process waits until the supply current of the on-board charger 72 reaches the current command value IV.

If it is determined that the supply current of the on-board charger 72 has reached the current command value IV (YES in Step S113), the process proceeds to Step S117, and the command output unit 49 transmits a "permission to change" the operating state to the first high-power component.

An overview of the processing content of Steps S111, S113, S115, and S117 is provided: if the on-board charger 72 cannot track the decrease in the drive current to be supplied, the command output unit 49 waits until the supply current of the on-board charger 72 reaches the current command value IV and then transmits a "permission to change" the operating state to the first high-power component. That is, the change in the operating state of the first high-power component is restricted until the supply current of the on-board charger 72 reaches the current command value IV.

On the other hand, if the drive current to be supplied to the high-power component does not decrease, or, if the on-board charger 72 can track the decrease in the drive current to be supplied, the "permission to change" the operating state is transmitted to the first high-power component without waiting until the supply current of the on-board charger 72 reaches the current command value IV. That is, the change in the operating state of the first high-power component is not restricted.

Effects of the Embodiment

As described in detail above, according to the current control method and the current control device for an on-board charger according to the present embodiment, when an on-board charger that supplies current to high-power components and a battery is controlled, the high-power components configured to compute current consumption based on their own operating states are set as first high-power components, and the sum of the charging current of the battery and the drive currents to be supplied to the first high-power components is calculated as the output current. Then, the output current is supplied to the high-power components and the battery from the on-board charger. As a result, even when current is supplied to the first high-power components, it is possible to prevent part of the charging current of the battery from flowing into and being consumed by the first high-power components. As a result, it is possible to prevent a long battery charging period.

Furthermore, since the first high-power components are configured to compute current consumption based on their own operating states, it is possible to calculate the current that would be consumed by the first high-power components after the operating states are changed before the operating states of the first high-power components are changed. By changing the drive current to be supplied to the first high-power components in accordance with the calculated current consumption, it is possible to prevent the quantity of current that is supplied for charging the battery from exceeding the quantity required to charge the battery (charging current value IB). As a result, it is possible to reduce the possibility of damage to or deterioration of the battery due to the supply of excess current.

In addition, according to the current control method and the current control device for an on-board charger according to the present embodiment, second high-power components not configured to compute current consumption based on their own operating states may be included in the high-power components. Even in this case, it is possible to prevent the current supplied for charging the battery from exceeding the charging current value IB. That is, supplying excess current to the battery can be prevented. For example, even if the operating state of the second high-power component is changed and the current consumed by the second high-power component becomes zero, the current supplied to charge the battery only becomes the charging current value IB, and supplying excess current to the battery does not occur.

In addition, the current control method and the current control device for an on-board charger according to the present embodiment may determine whether it is possible to carry out a tracking control to reduce the output current in accordance with a decrease in the current consumption of the first high-power component that accompanies a change in the operating state before the operating state of the first high-power component is changed. Then, if it is determined that the tracking control is not possible, the sum of the charging current and the current consumption of the first high-power component after the operating state is changed may be calculated as a target current, and the operating state may be changed after the output current is reduced to the target current. As a result, if the on-board charger cannot track changes in the current consumption of the first high-power component that accompany changes in the operating state, a change in the operating state of the first high-power component is restricted until the output current from the on-board charger decreases so that supplying excess current to the battery does not occur. Thus, supplying excess current to the battery can be prevented.

In addition, by means of the current control method and the current control device for an on-board charger according to the present embodiment, if it is determined that the tracking control is possible, the tracking control may be carried out by changing the operating state of the first high-power component. As a result, since a change in the operating state of the first high-power component is permitted without restriction within the range that the on-board charger can track, the operating state of the first high-power component can be changed quickly.

In the above-described embodiment, the relationship of correspondence between the current consumed by a high-power component and the operating state of the high-power component may be recorded in the control unit of the high-power component or in the vehicle controller 11.

In addition, the above-described relationship of correspondence may be recorded at the time of manufacture of the high-power component or may be acquired from an external server outside of the vehicle. Moreover, after use of the high-power component is started, the relationship between current consumption and the operating state of the high-power component may be learned by means of deep learning (deep learning, machine learning) using a neural network in order to acquire the relationship of correspondence. The relationships of correspondence may be realized by recording a correspondence table of current consumption and physical quantities that characterize the operating state by recording a function that expresses the current consumption using the physical quantities as independent variables.

Further, the process for computing the current consumed by the high-power component in a particular operating state may be carried out by the control unit of the high-power component or by the vehicle controller.

Although the content of the present invention was explained above in accordance with the embodiment, the present invention is not limited by these explanations, and it is obvious to a person skilled in the art that various modifications and improvements are possible. The discussion and drawings that constitute a portion of this disclosure should not be understood as limiting the present invention. Various alternative embodiments, examples, and operation techniques should be apparent to those skilled in the art from this disclosure.

Needless to say, the present invention includes various embodiments and the like not described herein. Accordingly, the technical scope of the present invention is determined only by the matters specifying the invention according to the Claims that are pertinent to the description above.

Each of the functions illustrated in the above-described embodiment can be implemented by one or a plurality of processing circuits. The processing circuits include programmed processing devices, such as processing devices including electrical circuits. The processing devices also include devices such as conventional circuit components and application-specific integrated circuits (ASICs) arranged to execute the functions described in the embodiment.

The invention claimed is:

1. A current control method for an on-board charger that supplies current to high-power components and a battery from a high-voltage system, in which the high-power components and the battery are connected in common, the current control method comprising:
    identifying first high-power components of the high-power components that are configured to compute current consumption based on their own operating states from among the high-power components;
    identifying second high-power components of the high-power components that are not configured to compute current consumption based on their own operating states;
    computing a sum of a charging current of the battery and a drive current to be supplied to the first high-power components as an output current, the charging current being a value required to charge the battery, the output current being the sum of the charging current of the battery and the drive current to be supplied to the first high-power components, the output current not including a power consumption of the second high-power components;

reducing the output current in accordance with a decrease of power consumption of the first high-powered components prior to the first high-powered components changing operating states; and supplying the output current from the on-board charger to the high-power components in order to supply current not consumed by the high-power components to the battery.

2. The current control method according to claim 1, wherein
before changing the operating state of one of the first high-power components,
determining whether it is possible to carry out tracking control in which the on-board charger reduces the output current in accordance with a decrease in the current consumption of the first high-power component due to the change, and
upon determining that the tracking control is not possible, the sum of the charging current and the current consumption of the first high-power components after the change is computed as a target current, and
the operating state is changed after reducing the output current to the target current.

3. The current control method according to claim 2, wherein
upon determining that the tracking control is possible, the operating state is changed, and the tracking control is carried out.

4. A current control method for an on-board charger that supplies current to high-power components and a battery from a high-voltage system in which the battery and the high-power components configured to current consumption based on their own operating states are connected in common, the current control method comprising:
computing a sum of a charging current of the battery and a drive current to be supplied to the high-power components as an output current; and
supplying the output current from the on-board charger to the high-voltage system in order to supply current not consumed by the high-power components to the battery,
before changing the operating state of one of the high-power components,
determining whether it is possible to carry out tracking control in which the on-board charger reduces the output current in accordance with a decrease in the current consumption of the high-power component due to the change, and
upon determining that the tracking control is not possible, the sum of the charging current and the current consumption of the high-power components after the change is computed as a target current, and
the operating state is changed after reducing the output current to the target current.

5. The current control method according to claim 4, wherein
upon determining that the tracking control is possible, the operating state is changed, and the tracking control is carried out.

6. The current control method according to claim 1, wherein the first high power components includes at least one of a heater and a compressor.

7. The current control method according to claim 1, wherein
the first high power components are sourced via a high-voltage system wiring.

8. A current control device for an on-board charger that supplies current to high-power components and a battery from a high-voltage system in which the high-power components and the battery are connected in common, the current control method comprising:
a characteristic determination circuit configured to identify first high-power components of the high-power components configured to compute current consumption based on their own operating states from among the high-power components, the characteristic determination circuit being further configured to identify second high-power components of the high-power components that are not configured to compute current consumption based on their own operating states;
a calculation circuit configured to compute a sum of a charging current to the battery and a drive current to be supplied to the first high-power components as an output current, the charging current being a value required to charge the battery, the output current being the sum of the charging current of the battery and the drive current to be supplied to the first high-power components, the output current supplied from the on-board charger to the high-power components not including a power consumption of the second high-power components, the calculation circuit being configured to reduce the output current in accordance with a decrease of power consumption of the first high-powered components prior to the first high-powered components changing operating states; and
a command output circuit that outputs to the on-board charger a command to supply the output current from the on-board charger to the high-power components in order to supply the current not consumed by the high-power components to the battery.

9. The current control method according to claim 8, wherein
the first high power components includes at least one of a heater and a compressor.

10. The current control method according to claim 8, wherein
the first high power components are sourced via a high-voltage system wiring.

11. A current control device for an on-board charger that supplies current to high-power components and a battery from a high-voltage system in which the battery and the high-power components configured to compute current consumption based on their own operating states, the current control device comprising:
a calculation circuit configured to compute a sum of a charging current of the battery and a drive current to be supplied to the high-power components as an output current; and
a trackability determination circuit configured to determine whether it is possible to carry out tracking control in which the on-board charger reduces the output current in accordance with a decrease in the current consumption of a high-power component due to a change in an operating state of one of the high-power components before the operating state of the high-power component is changed; and a command output circuit that outputs to the on-board charger a command to supply the output current from the on-board charger to the high-power components in order to supply the current not consumed by the high-power components to the battery, upon determining by the trackability determination circuit that the tracking control is not possible, the calculation circuit computes the sum of the charging current and the current consumption of the high-power components after the change as a target current, and the command output circuit changes the operating state after reducing the output current to the target current.

* * * * *